(12) United States Patent
Inami et al.

(10) Patent No.: US 12,233,699 B2
(45) Date of Patent: Feb. 25, 2025

(54) VEHICLE-BODY STRUCTURE WITH IMPROVED PASSENGER COMFORT AND VEHICLE-BODY STIFFNESS

(71) Applicant: Mazda Motor Corporation, Hiroshima (JP)

(72) Inventors: Takuma Inami, Hiroshima (JP); Nobuyuki Nakayama, Hiroshima (JP); Hiroyuki Baba, Hiroshima (JP); Hiroshi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 360 days.

(21) Appl. No.: 17/938,962

(22) Filed: Sep. 7, 2022

(65) Prior Publication Data

US 2023/0095674 A1 Mar. 30, 2023

(30) Foreign Application Priority Data

Sep. 30, 2021 (JP) .................................. 2021-161834
Nov. 10, 2021 (JP) .................................. 2021-183338

(51) Int. Cl.
*B60K 1/04* (2019.01)
*B60L 50/60* (2019.01)
*B62D 25/20* (2006.01)

(52) U.S. Cl.
CPC ................ *B60K 1/04* (2013.01); *B60L 50/66* (2019.02); *B62D 25/2009* (2013.01); *B60K 2001/0438* (2013.01)

(58) Field of Classification Search
CPC .... B60K 2001/0422; B60K 2001/0427; B60K 2001/0433; B60K 2001/0438
See application file for complete search history.

(56) References Cited

U.S. PATENT DOCUMENTS

| | | | |
|---|---|---|---|
| 9,499,205 B1 * | 11/2016 | Elia | B60K 6/28 |
| 11,186,159 B2 * | 11/2021 | Bikmukhametov | B60K 1/04 |
| 2012/0018238 A1 * | 1/2012 | Mizoguchi | B60L 50/66 |
| | | | 180/68.5 |
| 2012/0043147 A1 * | 2/2012 | Milner | B60L 50/64 |
| | | | 180/68.5 |
| 2018/0229772 A1 * | 8/2018 | Erlacher | B62D 25/2036 |
| 2021/0221239 A1 * | 7/2021 | Kawase | B60L 50/66 |
| 2022/0069405 A1 * | 3/2022 | Choi | B60L 3/0007 |

FOREIGN PATENT DOCUMENTS

| | | |
|---|---|---|
| JP | 2005-41395 A | 2/2005 |
| JP | 2009-101815 A | 5/2009 |
| JP | 2011-240762 A | 12/2011 |
| JP | 2019-123461 A | 7/2019 |
| JP | 2019-177831 A | 10/2019 |
| JP | 2021-35789 A | 3/2021 |

* cited by examiner

*Primary Examiner* — Brian L Swenson
(74) *Attorney, Agent, or Firm* — XSENSUS LLP

(57) ABSTRACT

A vehicle-body structure increases comfort inside a vehicle cabin and improves vehicle-body stiffness. A battery housing portion in which a battery is housed and a battery non-housing portion in which the battery is not housed are provided alongside in a vehicle front-rear direction below the vehicle cabin. A second frame portion disposed at the battery non-housing portion is larger than a first frame portion disposed at the battery housing portion in a vehicle width direction.

13 Claims, 8 Drawing Sheets

VEHICLE-BODY STRUCTURE WITH IMPROVED PASSENGER COMFORT AND VEHICLE-BODY STIFFNESS

CROSS-REFERENCES TO RELATED APPLICATIONS

The present application claims priority to Japanese Patent Application 2021-161834, filed Sep. 30, 2021, Japanese Patent Application 2021-183338, filed Nov. 10, 2021, the entire contents of each of which are incorporated herein by reference.

TECHNICAL FIELD

The present disclosure relates to a vehicle-body structure provided in an electric automobile that improves passenger comfort and vehicle-body stiffness.

BACKGROUND

As disclosed in, for example, Japanese Patent Laid-open No. 2011-240762 ("Patent Literature 1"), a battery for supplying electric power to a traveling motor may be positioned below a floor panel in an electric vehicle. In Patent Literature 1, a lower frame is provided at a lower portion of a vehicle body. The lower frame includes a front cross member extending in the vehicle width direction at a vehicle-body front portion, a center member extending on the vehicle rear side from a vehicle-width-direction central portion of the front cross member, and a pair of right and left lockers extending on the vehicle rear side from respective end portions of the front cross member in the vehicle width direction. The battery is housed in a space surrounded by the front cross member, the lockers, and the center member.

However, when the lower frame and the battery are arranged entirely below the floor panel as in Patent Literature 1, the height of the floor panel is high throughout due to the lower frame and the battery, which can reduce comfort of passengers in the vehicle cabin. This problem can be handled by increasing the overall height of the automobile, but the method of increasing the overall height cannot be employed in some cases due to problems with design of the automobile and restrictions on the overall height from parking structures and the like.

The present disclosure has been made in view of the above-described problem and has an objective to provide a vehicle-body structure that can increase comfort inside a vehicle cabin and improve vehicle-body stiffness.

SUMMARY

To achieve the above-described objective, a vehicle-body structure provided in an electric vehicle including a traveling motor may be premised in a first aspect of the present disclosure. The vehicle-body structure according to the first aspect of the present disclosure includes: a battery unit including a battery frame and a battery that supplies electric power to the traveling motor, where the battery frame is disposed below a vehicle cabin and extends in a vehicle front-rear direction. A battery housing portion in which the battery is housed and a battery non-housing portion in which the battery is not housed are provided alongside each other (in other words, adjacent to each other) in a vehicle front-rear direction below the vehicle cabin.

The battery frame includes a first frame portion disposed at the battery housing portion, and a second frame portion disposed at the battery non-housing portion, and the second frame portion is larger in width than the first frame portion in a vehicle width direction.

With this first configuration, a floor panel at a part corresponding to the battery non-housing portion can be lowered. Accordingly, comfort of passengers in the vehicle cabin improves. However, since the battery is not housed in the battery non-housing portion, vehicle-body stiffness potentially decreases in this region. In order to address this problem, the battery frame extending in the vehicle front-rear direction is disposed below the vehicle cabin, and also the second frame portion disposed at the battery non-housing portion is larger in width than the first frame portion disposed at the battery housing portion and has high strength. Thus, in the first configuration, vehicle-body stiffness at the battery non-housing portion is high, as well.

In a second aspect of the present disclosure, the battery housing portion includes a front-side battery housing portion provided on a vehicle front side of the battery non-housing portion, and a rear-side battery housing portion provided on a vehicle rear side of the battery non-housing portion. The first frame portion includes a front-side first frame portion disposed at the front-side battery housing portion, and a rear-side first frame portion disposed at the rear-side battery housing portion.

With this second configuration, the number of mounted batteries can be increased by housing a battery in each of the front-side battery housing portion and the rear-side battery housing portion, and in this case, comfort can be improved by using the battery non-housing portion positioned between the front-side battery housing portion and the rear-side battery housing portion.

In a third aspect of the present disclosure, the first frame portion and the second frame portion have hollow shapes. A first harness extending in the vehicle front-rear direction is disposed below the first frame portion and the second frame portion.

With this third configuration, a space below the first frame portion and the second frame portion can be used as a disposition space for the first harness.

In a fourth aspect of the present disclosure, a second harness for a bus bar connecting a battery housed in the front-side battery housing portion and a battery housed in the rear-side battery housing portion is disposed alongside of (or adjacent to) the first harness in the vehicle width direction below the second frame portion.

With this fourth configuration, the second harness for a bus bar connects a battery on the front side and a battery on the rear side and thus is disposed extending in the front-rear direction through the lower side of the second frame portion. Since the second harness for a bus bar and the first harness are arranged alongside (or adjacent to) each other in the vehicle width direction, the dimension in the up-down direction is shortened so that adverse influence on comfort is avoided, and both harnesses are disposed by effectively using the space below the second frame portion having a larger width.

In a fifth aspect of the present disclosure, a recessed portion that is recessed downward is formed at a part of a floor panel, the part corresponding to the battery non-housing portion.

With this fifth configuration, since the recessed portion is formed at the floor panel, the height of that part is lowered. Accordingly, for example, a foot space for a passenger increases, and comfort improves.

In a sixth aspect of the present disclosure, a center frame disposed to be higher than and away from a floor panel at a vehicle-width-direction central portion of the occupant space and extending in the vehicle front-rear direction, and a connection member having an upper portion fixed to the center frame and having a lower portion fixed to a part of the floor panel, the part corresponding to the second frame portion, are further included.

With this sixth configuration, the center frame is solidly connected since the center frame is connected to the second frame portion having a higher strength than that of the first frame portion.

As described above in reference to various aspects of the present disclosure, since a battery housing portion and a battery non-housing portion are provided below a vehicle cabin and a second frame portion disposed at the battery non-housing portion is larger in width than a first frame portion disposed at the battery housing portion in the vehicle width direction, comfort of passengers inside the vehicle cabin can be increased and vehicle-body stiffness can be improved.

DETAILED DESCRIPTION

An embodiment of the present disclosure will be described below in detail with reference to the accompanying drawings. The following description of the preferable embodiment is merely exemplary in essence and not intended to limit the present disclosure, its application, nor its usage.

Figure 1:
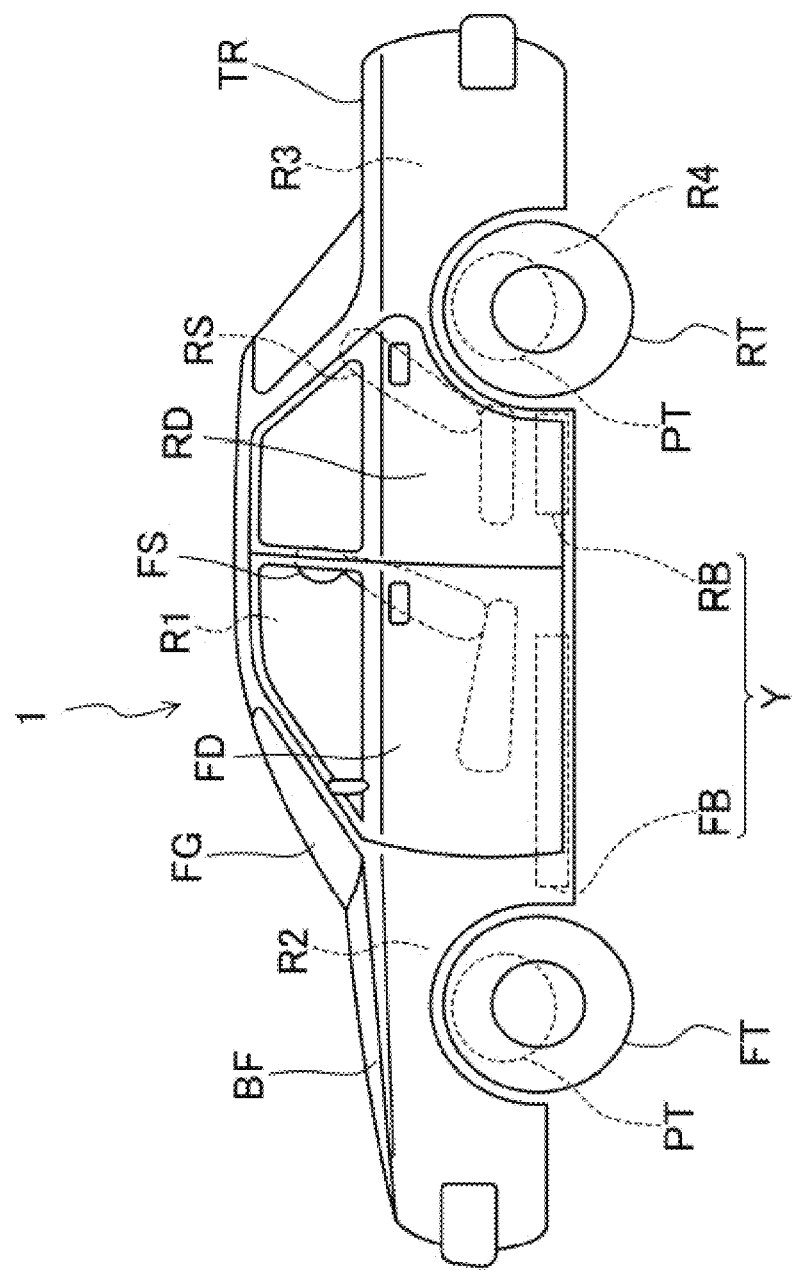
FIG. 1 is a side view of an automobile having a vehicle-body structure according to an embodiment of the present disclosure.

FIG. 1 is a side view of an automobile 1 including a vehicle-body structure A according to the embodiment of the present disclosure when viewed from left. In describing the embodiment, a vehicle front-rear direction is simply referred to as a "front-rear direction", a vehicle front side is simply referred to as a "front side", and a vehicle "rear side" is simply referred to as a "rear side". In addition, a vehicle width direction is the right-left direction of the vehicle, a vehicle left side is simply referred to as a "left side", and a vehicle right side is simply referred to as a "right side".

Entire Structure of Automobile

In some embodiments, the automobile 1 is a passenger automobile, and an occupant space R1 in which a passenger boards is provided at a front-rear direction intermediate portion of the automobile 1. The occupant space R1 includes front seats (front-row seats) FS included in a front row, and rear seats (rear-row seats) RS included in a rear row. The front seats FS include a driver seat arranged on the right side (or the left side) in the occupant space R1, and a front passenger seat arranged on the left side (or the right side) in the occupant space R1. The rear seats RS are arranged on the right and left sides, respectively, in the occupant space R1. Although not illustrated, third-row seats may be arranged on the rear side of the rear seats RS. Alternatively, the rear seats RS may be omitted.

A front door FD and a rear door RD are disposed on each of the left and right sides of the occupant space R1. The rear door RD may be omitted in a case of the automobile 1 including no rear seats RS.

As illustrated in the embodiment of FIG. 1, a front-side space R2 is provided on the front side of the occupant space R1 in the automobile 1. A powertrain PT can be mounted in the front-side space R2 as necessary. When the powertrain PT is mounted in the front-side space R2, the front-side space R2 may be called, for example, a powertrain storage room, a motor room, or an engine room. A bonnet hood BF is provided at an upper portion of the front-side space R2.

A trunk space R3 in which a package or the like can be housed may be provided on the rear side of the occupant space R1 in the automobile 1. The trunk space R3 can be opened and closed by a trunk lid TR. A rear-side space R4 may be provided on the rear side of the occupant space R1 and at a position lower than the trunk space R3 in the automobile 1. The powertrain PT that generates power for the automobile 1 can be mounted in the rear-side space R4 as necessary. When the powertrain PT is mounted in the rear-side space R4, the rear-side space R4 may be called, for example, a powertrain storage room, a motor room, or an engine room.

The powertrain PT may be mounted in each of the front-side space R2 and the rear-side space R4 or the powertrain PT may be mounted in one of them. A front-wheel-drive vehicle in which only front wheels FT are driven by the powertrain PT is achieved when the powertrain PT is mounted only in the front-side space R2, or a rear-wheel-drive vehicle in which only rear wheels RT are driven by the powertrain PT is achieved when the powertrain PT is mounted only in the rear-side space R4. Alternatively, a four-wheel-drive vehicle is achieved when the front wheels FT and the rear wheels RT are driven by the powertrains PT mounted in both the front-side space R2 and the rear-side space R4.

Each powertrain PT includes at least a traveling motor M (illustrated in FIG. 2) for driving a drive wheel and also includes a speed reducer, a transmission, or the like as necessary. Thus, the automobile 1 is an electric vehicle. The traveling motor M is disposed such that the rotation center thereof extends in the right-left direction. The powertrain PT may include, for example, a controller in addition to the traveling motor M. The powertrain PT may include an internal combustion engine. A battery unit Y (also illustrated in FIG. 1) for supplying electric power to the traveling motor M is mounted at a lower portion of the automobile 1. For example, the battery unit Y may be charged by using power generated by the internal combustion engine, and either the front wheels FT or the rear wheels RT or both may be driven by power generated by the internal combustion engine.

The type of the automobile 1 does not necessarily need to be a four-door vehicle as exemplarily illustrated in FIG. 1 and may be, for example, an automobile including no rear doors RD. The present disclosure is also applicable to an automobile, such as a hatchback vehicle, in which the rear-side space R4 can be opened and closed by a tail gate.

Figure 2:
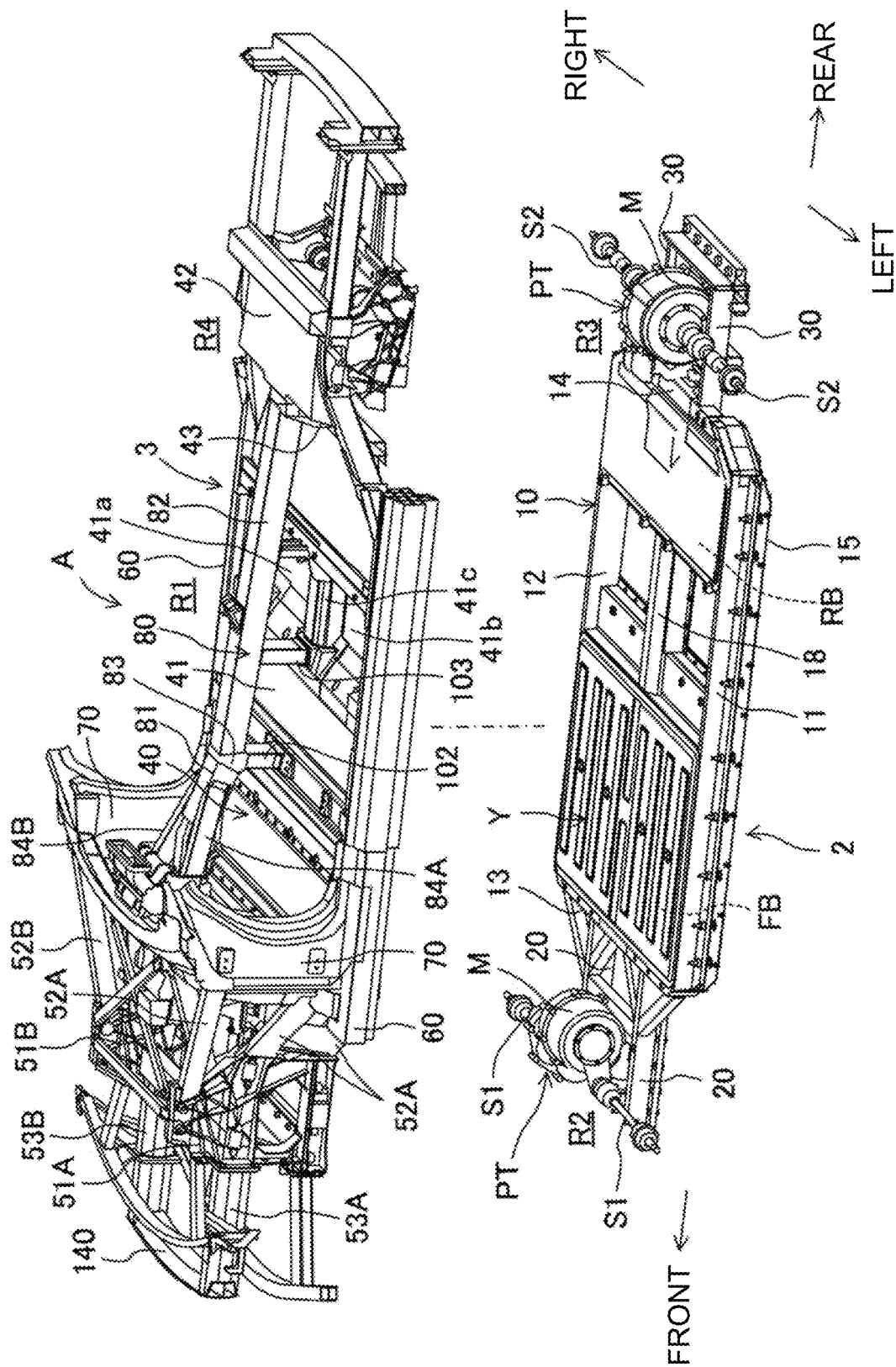
FIG. 2 is a perspective view illustrating a state in which the automobile is divided into an upper-portion structural body and a lower-portion structural body.

As illustrated in FIG. 2, the automobile 1 includes a lower-portion structural body 2 and an upper-portion structural body 3, and the vehicle-body structure A is constituted by the lower-portion structural body 2 and the upper-portion structural body 3. FIG. 2 illustrates a state in which the doors FD and RD, the bonnet hood BF, a fender, window glasses, a roof, a center pillar, a rear pillar, a bumper, front and rear lighting devices, an instrument panel, the front and rear seats, and the like, which are included in the upper-portion structural body 3 when the automobile is assembled, are removed. FIG. 2 also illustrates a state in which the front wheels FT, the rear wheels RT, a suspension device, and the like, which are included in the lower-portion structural body 2 when the automobile is assembled, are removed.

The lower-portion structural body 2 includes the battery unit Y. The battery unit Y includes a front-side battery FB, a rear-side battery RB, and a rack frame 10 surrounding the front-side battery FB and the rear-side battery RB. The lower-portion structural body 2 also includes a front support frame 20 extending from a front portion of the rack frame 10 toward the front side, and a rear support frame 30 extending from a rear portion of the rack frame 10 toward the rear side.

In a typical electric automobile, a battery unit is often detachably attached as a separated body from a vehicle body under a floor; but, in the embodiment of FIG. 2, not only the batteries FB and RB but also the front support frame 20 and the rear support frame 30 are integrated with the rack frame 10 surrounding the batteries FB and RB, and the front support frame 20 and the rear support frame 30 are detachably attached to the upper-portion structural body 3 together with the batteries FB and RB.

Specifically, as illustrated in FIG. 2, in some embodiments, the automobile 1 may be configured to be dividable in the up-down direction into the lower-portion structural body 2 including the batteries FB and RB, and the upper-portion structural body 3 in which the occupant space R1 and the trunk space R3 are formed. When the structure is divided in the up-down direction, integration of the lower-portion structural body 2 with the upper-portion structural body 3 may be achieved by using fastening members such as bolts and nuts, screws, and the like without using welding, bonding, and the like. Accordingly, the lower-portion structural body 2 can be separated from the upper-portion structural body 3 as necessary when maintenance and repair are performed after the automobile 1 is handed over to a user, thereby making it easier to maintain the vehicle than in conventional electric automobiles.

It is known to use a vehicle-body structure of a ladder-frame type for an automobile. In a case of the vehicle-body structure of the ladder-frame type, division into a ladder-frame and a cabin in the up-down direction is possible, but the ladder-frame continuously extends in the front-rear direction and thus mainly receives a collision load during a front-end collision or a rear-end collision. In the event of a side collision, the ladder-frame only supplementarily receives a collision load, and the collision load is mainly received by the cabin. In this manner, in the vehicle-body structure of the ladder-frame type, it is normal that a member that receives a collision load during a front-end or a rear-end collision is different than during a side collision.

However, in a case of the automobile 1 of the embodiment illustrated in FIG. 2, the lower-portion structural body 2, which includes the front support frame 20 and the rear support frame 30, and the upper-portion structural body 3 can be divided from each other. The technical idea of this divided structure is largely different from that of the conventional vehicle-body structure of the ladder-frame type, because a collision load is received by the lower-portion structural body 2 and the upper-portion structural body 3 in both cases of front or rear collision and side collision and thus the collision load can be dispersed to and absorbed by the structural bodies 2 and 3, which improves vehicle safety during collisions when compared to conventional ladder-frame type vehicles.

Hereinafter, the structures of the lower-portion structural body 2 and the upper-portion structural body 3 will be sequentially described.

Lower-Portion Structural Body

First, the lower-portion structural body 2 will be described below. The lower-portion structural body 2 includes the powertrain PT, the front wheels FT, the rear wheels RT, and front-side suspension devices SP1 and SP2 and rear-side suspension devices SP3 and SP4, which are illustrated with virtual lines in FIG. 4, in addition to the batteries FB and RB, the rack frame 10, the front support frame 20, and the rear support frame 30. The formats of the front-side suspension devices SP1 and SP2 and the rear-side suspension devices SP3 and SP4 are not particularly limited, and the vehicle-body structure may be changed in accordance with the formats of the front-side suspension devices SP1 and SP2 and the rear-side suspension devices SP3 and SP4.

As illustrated in FIG. 2, the rack frame 10 as a framework of the battery unit Y is a member for surrounding and protecting the front-side battery FB, the rear-side battery RB, harnesses, and the like. The rack frame 10 is formed in such a large size that, on the lower side of an occupant-space-side floor panel 41 to be described later, the rack frame 10 extends from the vicinity of a left end portion of the occupant-space-side floor panel 41 to the vicinity of a right end portion thereof and extends from the vicinity of a front end portion of the occupant-space-side floor panel 41 to the vicinity of a rear end portion thereof. In this manner, since the rack frame 10 is provided in a large part of a region on the lower side of the occupant-space-side floor panel 41, the batteries FB and RB having large capacities can be mounted on the automobile 1. The batteries FB and RB may be, for example, lithium-ion batteries or all-solid-state batteries or may be any other secondary batteries. Alternatively, the batteries FB and RB may be what is called battery cells or may be battery packs in which a plurality of battery cells are housed.

The rack frame 10 includes a left-side member 11, a right-side member 12, a front-side member 13, and a rear-side member 14. The left-side member 11, the right-side member 12, the front-side member 13, and the rear-side member 14 are formed of, for example, an extruded material made of an aluminum alloy, but may be formed of a press-formed material such as an aluminum alloy plate material or a steel plate. In description below, an "extruded material" is an extruded material made of an aluminum alloy, and a "press-formed material" is a press-formed material such as an aluminum alloy plate material or a steel plate. Alternatively, each member may be formed of, for example, cast metal or die cast.

A cross-sectional shape of each of the left-side member 11, the right-side member 12, the front-side member 13, and the rear-side member 14 in a direction orthogonal to its longitudinal direction is a rectangular shape. The left-side member 11, the right-side member 12, the front-side member 13, and the rear-side member 14 are all arranged at the same height and substantially horizontally extend. When the lower-portion structural body 2 is to be connected to the upper-portion structural body 3, the front-side member 13 is fastened and fixed to a lower portion of a dash panel 50 by a fastening member, and the left-side member 11 and the right-side member 12 are fastened and fixed to right and left side sills 60, respectively, by fastening members. The rear-side member 14 is fastened and fixed to a connection panel 43, which will be described later, by a fastening member.

The left-side member 11 is provided at a left end portion of the lower-portion structural body 2 and extends in the front-rear direction. The right-side member 12 is provided at a right end portion of the lower-portion structural body 2 and extends in the front-rear direction. The left-side member 11 and the right-side member 12 are arranged on a vehicle-width-direction inner side of the right and left side sills 60, respectively, to be described later. As illustrated in, for example, FIG. 5, the front-side member 13 is provided at a front portion of the battery unit Y and extends in the right-left direction from a front end portion of the left-side member 11 to a front end portion of the right-side member 12. A left end portion of the front-side member 13 and the front end portion of the left-side member 11 are connected to each other, and a right end portion of the front-side member 13 and the front end portion of the right-side member 12 are connected to each other. The rear-side member 14 is provided at a rear portion of the battery unit Y and extends in the right-left direction from a rear end portion of the left-side member 11 to a rear end portion of the right-side member 12. A left end portion of the rear-side member 14 and the rear end portion of the left-side member 11 are connected to each other, and a right end portion of the rear-side member 14 and the rear end portion of the right-side member 12 are connected to each other.

A cover member 15 as a bottom plate is attached to a lower portion of the rack frame 10. The rack frame 10 is blocked from the lower side by the cover member 15. The cover member 15 substantially horizontally extends and is fixed to lower surfaces of the left-side member 11, the right-side member 12, the front-side member 13, and the rear-side member 14 and also fixed to the side sills 60 as described later. Note that an upper portion of the rack frame 10 may be blocked by a non-illustrated lid or may be blocked by the occupant-space-side floor panel 41 to be described later. Note that electric power of the batteries FB and RB housed in the rack frame 10 is supplied to the traveling motor M through a non-illustrated traveling control circuit. The batteries FB and RB can be charged through a non-illustrated charging socket.

Figure 6:
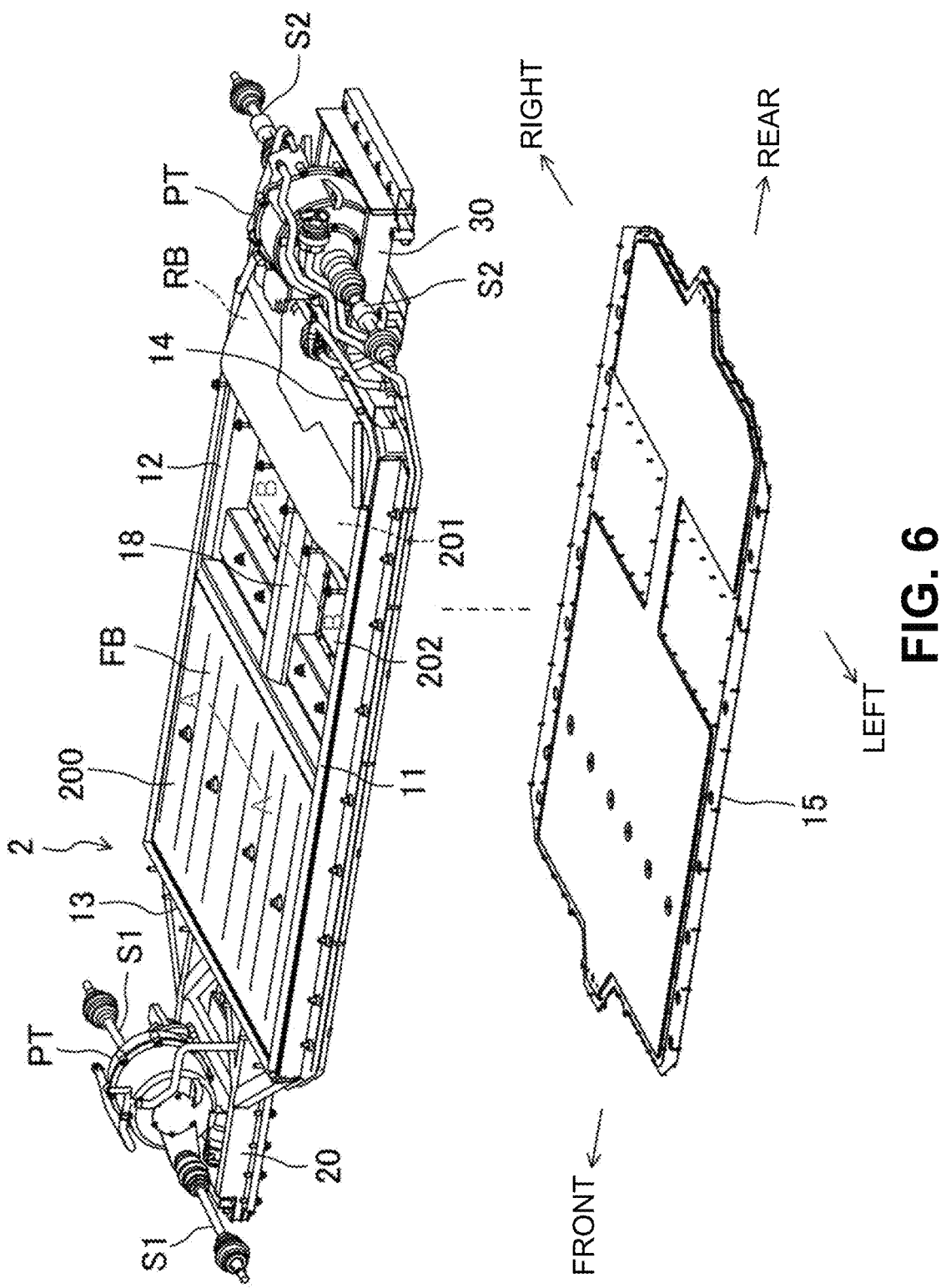
FIG. 6 is a perspective view illustrating part of the lower-portion structural body in a state in which a cover member is removed.

As illustrated in FIG. 6, a front part inside of the rack frame 10 is referred to as a front-side battery housing portion 200 in which the front-side battery FB is housed, and a rear part inside of the rack frame 10 is referred to as a rear-side battery housing portion 201 in which the rear-side battery RB is housed. A part between the front-side battery housing portion 200 and the rear-side battery housing portion 201 is a part in which no battery is housed, and this part in which no battery is housed is referred to as battery non-housing portion 202. In other words, the front-side battery housing portion 200, the battery non-housing portion 202, and the rear-side battery housing portion 201 are provided alongside each other (in other words, adjacent to each other) in the front-rear direction. Note that one of the front-side battery housing portion 200 and the rear-side battery housing portion 201 may be omitted in some embodiments.

Figure 5:
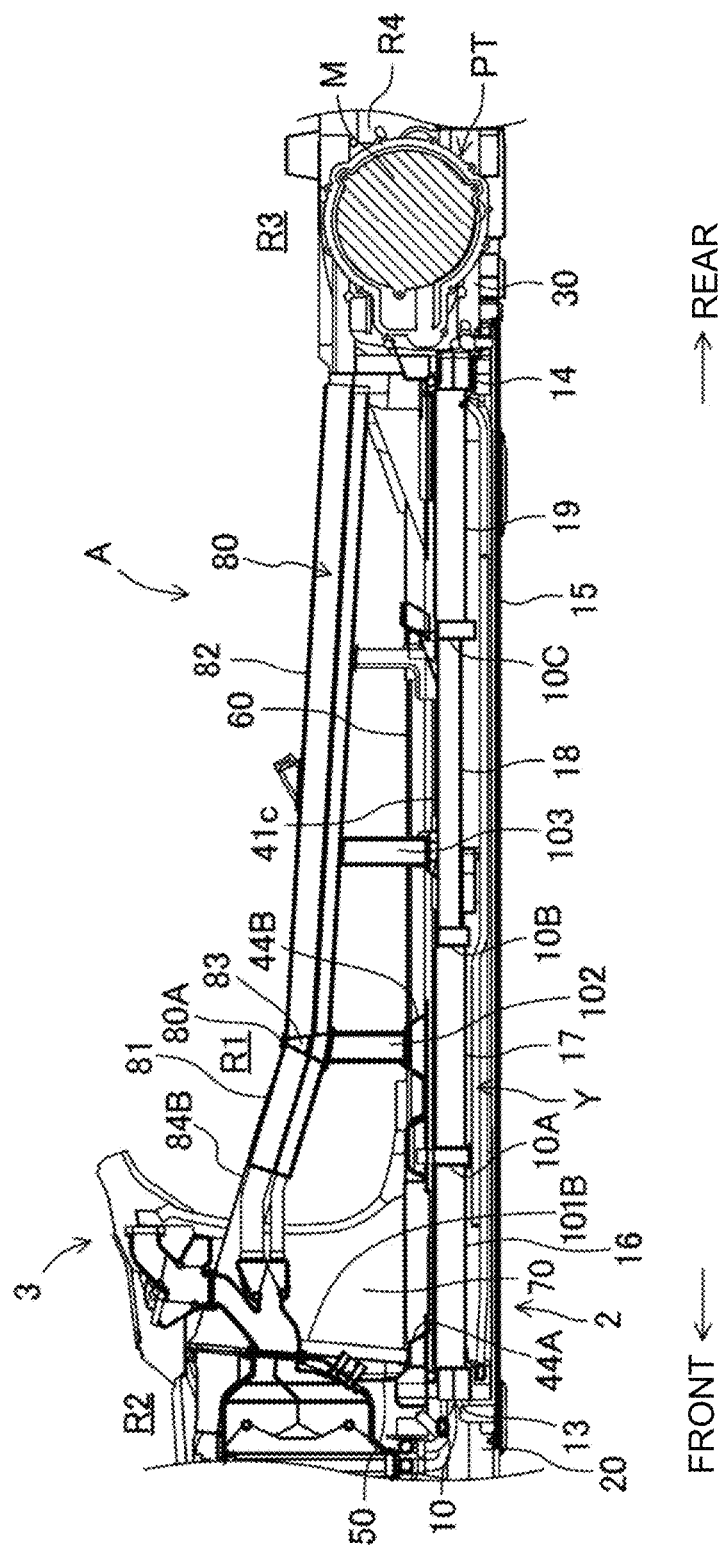
FIG. 5 is a cross-sectional diagram along line V-V in FIG. 4.

FIG. 5 illustrates a cross-section of a right-left direction central portion of the vehicle-body structure A. As illustrated in FIG. 5, first to third battery-side cross members 10A, 10B, and 10C formed as hollow members are provided inside the rack frame 10 as reinforcement members extending in the right-left direction. The heights of the first to third battery-side cross members 10A, 10B, and 10C are all the same and are the same as the heights of the front-side member 13 and the rear-side member 14. The first to third battery-side cross members 10A, 10B, and 10C may be formed of extruded materials or may be formed of press-formed materials. In the present embodiment, the three battery-side cross members 10A, 10B, and 10C are provided, but the number of the battery-side cross members 10A, 10B, and 10C may be increased or decreased in accordance with dimensions of the rack frame 10 in the front-rear direction.

The first to third battery-side cross members battery-side cross members 10A, 10B, and 10C are arranged at an interval from each other in the front-rear direction, the first battery-side cross member 10A is positioned farthest on the front side, and the third battery-side cross member 10C is positioned farthest on the rear side. Lower portions of the battery-side cross members 10A, 10B, and 10C are fixed to an upper surface of the cover member 15. Left end portions of the battery-side cross members 10A, 10B, and 10C are fixed to an inner surface (right-side surface) of the left-side member 11, and right end portions of the battery-side cross members 10A, 10B, and 10C are fixed to an inner surface (left-side surface) of the right-side member 12. In other words, the battery-side cross members 10A, 10B, and 10C are members connecting the left-side member 11 and the right-side member 12.

A front-portion central member 16 and first to third rear-portion central members 17 to 19 as hollow reinforcement members extending in the front-rear direction are provided inside the rack frame 10. The front-portion central member 16 and the first to third rear-portion central members 17 to 19 may be referred to as a battery frame extending in the front-rear direction, and the battery unit Y has a structure including the battery frame constituted by the front-portion central member 16, the first to third rear-portion central members 17 to 19, and the like. The left-side member 11, the right-side member 12, the front-side member 13, and the rear-side member 14 may be included in the battery frame.

The front-portion central member 16 and the first to third rear-portion central members 17 to 19 are arranged at substantially same heights and provided at a right-left direction center of the rack frame 10. Lower end portions of the front-portion central member 16 and the first to third rear-portion central members 17 to 19 are attached to the upper surface of the cover member 15. The front-portion central member 16 and the first to third rear-portion central members 17 to 19 extend from the front-side member 13 to the rear-side member 14.

The front-portion central member 16 is a front-side first frame portion disposed at the front-side battery housing portion 200 and is arranged between the front-side member 13 and the first battery-side cross member 10A. A front end portion of the front-portion central member 16 is fixed to a right-left direction central portion of the front-side member 13, and a rear end portion of the front-portion central member 16 is fixed to a right-left direction central portion of the first battery-side cross member 10A. Accordingly, the front-side member 13 is a member extending to connect the front end portions of the left-side member 11 and the right-side member 12 to the front end portion of the front-portion central member 16.

The first rear-portion central member 17 is a front-side first frame portion disposed at the front-side battery housing portion 200 on the rear side of the front-portion central member 16 and is arranged between the first battery-side cross member 10A and the second battery-side cross member 10B. A front end portion of the first rear-portion central member 17 is fixed to the right-left direction central portion of the first battery-side cross member 10A, and a rear end portion of the first rear-portion central member 17 is fixed to a right-left direction central portion of the second battery-side cross member 10B.

The second rear-portion central member 18 is a second frame portion disposed at the battery non-housing portion 202 on the rear side of the first rear-portion central member 17 and is arranged between the second battery-side cross member 10B and the third battery-side cross member 10C. A front end portion of the second rear-portion central member 18 is fixed to the right-left direction central portion of the second battery-side cross member 10B, and a rear end portion of the second rear-portion central member 18 is fixed to a right-left direction central portion of the third battery-side cross member 10C.

The third rear-portion central member 19 is a rear-side first frame portion disposed at the rear-side battery housing portion 201 on the rear side of the second rear-portion central member 18 and is arranged between the third battery-side cross member 10C and the rear-side member 14. A front end portion of the third rear-portion central member 19 is fixed to the right-left direction central portion of the third battery-side cross member 10C, and a rear end portion of the third rear-portion central member 19 is fixed to a right-left direction central portion of the rear-side member 14.

Accordingly, the first to third battery-side cross members 10A, 10B, and 10C and the front-portion central member 16 and the first to third rear-portion central members 17 to 19 are disposed in a lattice shape and connected to each other inside the rack frame 10, which further increases the effect of reinforcing the rack frame 10 and thus the effect of reinforcing the lower-portion structural body 2.

When a virtual straight line extending in the front-rear direction in a plan view is assumed, the positions of the front-portion central member 16 and the first to third rear-portion central members 17 to 19 in the right-left direction are set such that the members are arranged on the virtual line. In other words, the members are provided such that the first to third rear-portion central members 17 to 19 are positioned on a virtual extended line from the front-portion central member 16 on the rear side.

Figure 7:
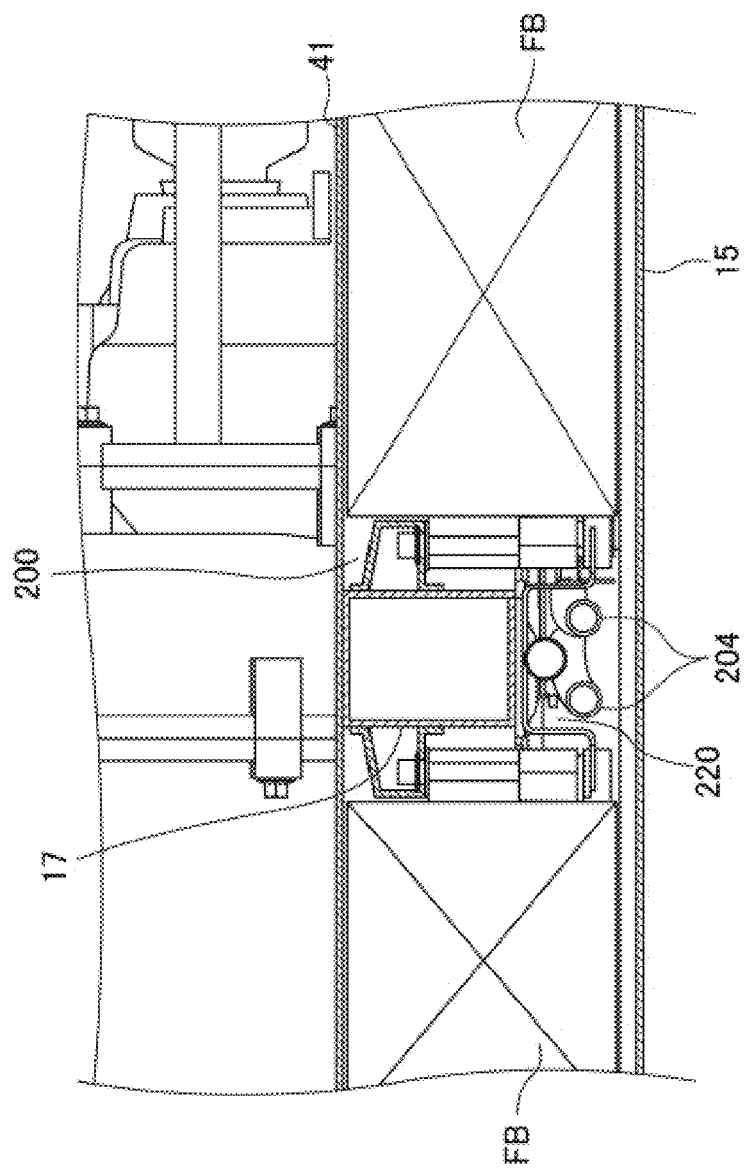
FIG. 7 is a cross-sectional diagram along line A-A in FIG. 6.

FIG. 7 is a cross-sectional diagram along line A-A in FIG. 6 and illustrates a section corresponding to the front-side battery housing portion 200. The front-side battery FB is housed on each of the right and left sides of the first rear-portion central member 17 provided in the rack frame 10. A first harness 204 extending in the front-rear direction is disposed below the first rear-portion central member 17. The first harness 204 extends from the front portion of the rack frame 10 to the rear portion thereof, and accordingly, is disposed extending in the front-rear direction through the lower side of the front-portion central member 16 and the first to third rear-portion central members 17 to 19. In the present embodiment, two first harnesses 204 are disposed alongside each other in the vehicle width direction, but the present disclosure is not limited thereto and one first harness 204 may be provided or three or more first harnesses 204 may be provided.

Figure 8:
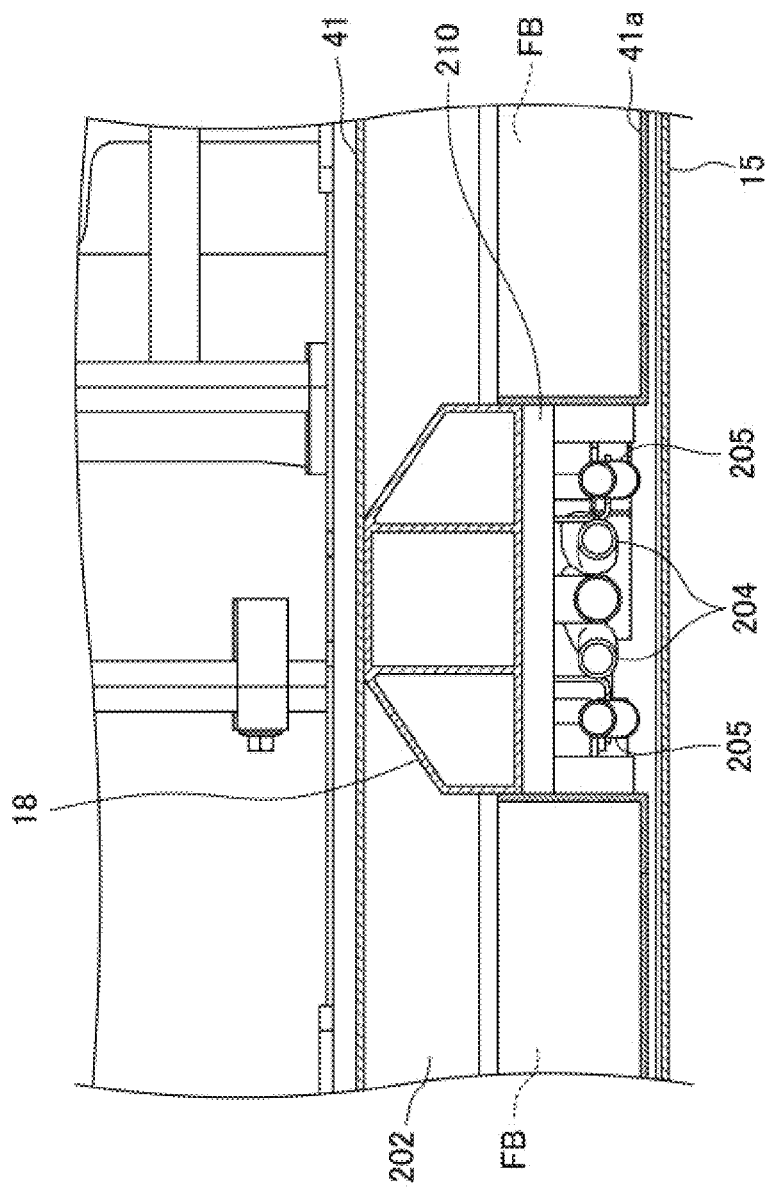
FIG. 8 is a cross-sectional diagram along line B-B in FIG. 6.

FIG. 8 is a cross-sectional diagram along line B-B in FIG. 6 and illustrates a section corresponding to the battery non-housing portion 202. The second rear-portion central member 18 is provided at the battery non-housing portion 202. The second rear-portion central member 18 is larger in width than the first rear-portion central member 17 illustrated in FIG. 7 in the vehicle width direction. Specifically, the dimension of the second rear-portion central member 18 in the vehicle width direction is set to be longer than the dimension of the first rear-portion central member 17 in the vehicle width direction, the first rear-portion central member 17 and the second rear-portion central member 18 are arranged such that a left end portion of the second rear-portion central member 18 protrudes on the left side of a left end portion of the first rear-portion central member 17 and a right end portion of the second rear-portion central member 18 protrudes on the right side of a right end portion of the first rear-portion central member 17 when viewed in the front-rear direction. Accordingly, the width of a space 210 (illustrated in FIG. 8) directly below the second rear-portion central member 18 is larger than the width of a space 220 (illustrated in FIG. 7) directly below the first rear-portion central member 17. Stiffness is likely to decrease at a part where the front-side battery FB and the rear-side battery RB are not positioned in some cases, but the second rear-portion central member 18 having a large width is provided at the part where the front-side battery FB and the rear-side battery RB are not positioned, and thus stiffness decrease can be suppressed. Note that the first rear-portion central member 17 and the second rear-portion central member 18 are arranged at the same height, and accordingly, the dimensions of the space 210 and the space 220 in the up-down direction are substantially equal.

A second harness 205 for a bus bar is disposed in addition to the first harness 204 below the second rear-portion central member 18. The second harness 205 for a bus bar is a harness for connecting the front-side battery FB and the rear-side battery RB and thus extends in the front-rear direction, but is not provided at the front-side battery housing portion 200 and the rear-side battery housing portion 201 and passes through the battery non-housing portion 202. The second harness 205 is positioned on each of the right and left sides of the first harness 204. Accordingly, a larger number of harnesses 204 and 205 are disposed in the space 210 below the second rear-portion central member 18 than in the space 220 below the first rear-portion central member 17, but the disposition of a large number of harnesses 204 and 205 causes no problem since the width of the space 210 is relatively large. The first harnesses 204 and the second harnesses 205 are not limited to the illustrated arrangement but may be optionally arranged.

As illustrated in FIG. 2, a pair of right and left front support frames 20 are provided and connected to the front-side member 13 of the rack frame 10. The front-side powertrain PT is attached to each front support frame 20 through a non-illustrated mounting member. In the lower-portion structural body 2, drive shafts S1 through which output from the powertrain PT (rotational force of the traveling motor M) is transferred to the right and left front wheels FT, respectively, are provided on the right and left sides.

Similarly to the front support frames 20, a pair of right and left rear support frames 30 are provided and connected to the rear-side member 14 of the rack frame 10. The rear-side powertrain PT is attached to each rear support frame 30 through a non-illustrated mounting member. In the lower-portion structural body 2, drive shafts S2 through which output from the powertrain PT (rotational force of the traveling motor M) is transferred to the right and left rear wheels, respectively, are provided on the right and left sides.

Upper-Portion Structural Body

Subsequently, the upper-portion structural body 3 will be described below. The upper-portion structural body 3 includes a floor member 40, the dash panel 50, and the pair of right and left-side sills 60. The floor member 40 is a member arranged at a higher position than the rack frame 10 and the rear support frames 30 of the lower-portion structural body 2. The floor member 40 includes the occupant-space-side floor panel (first floor panel) 41 constituting a floor of the occupant space R1 including the front seats FS and the rear seats RS (illustrated in FIG. 1) on which passengers sits, a trunk-space-side floor panel (second floor panel) 42 constituting a floor of the trunk space R3, and the connection panel 43 connecting a rear portion of the occupant-space-side floor panel 41 and a front portion of the trunk-space-side floor panel 42.

The floor member 40 may be formed of, for example, a member shaped by pressing a steel plate or the like. The occupant-space-side floor panel 41, the trunk-space-side floor panel 42, and the connection panel 43 may be integrally formed or may be separately formed and then connected. In the present embodiment, description is made with the three divided portions of the occupant-space-side floor panel 41, the trunk-space-side floor panel 42, and the connection panel 43, but the floor member 40 including the panels 41 to 43 may be referred to as a floor panel. Alternatively, only the occupant-space-side floor panel 41 may be referred to as a floor panel.

The occupant-space-side floor panel 41 extends from a front portion of the occupant space R1 to a rear portion thereof and from a left-side portion of the occupant space R1 to a right-side portion thereof. The occupant-space-side floor panel 41 according to the embodiment of FIG. 2 has a floor tunnel-less structure including no tunnel portion. Specifically, a floor panel of a conventional automobile is typically provided with a tunnel portion largely bulging upward and extending in the front-rear direction. The tunnel portion is a portion for allowing, for example, insertion of an exhaust pipe extending toward a rear side from an engine mounted in an engine room at a vehicle front portion and insertion of a propeller shaft through which output from the engine is transferred to rear wheels. The diameters of the exhaust pipe and the propeller shaft are often, for example, equal to or larger than 10 cm, and furthermore, a gap of at least several centimeters or larger needs to be provided between each of the exhaust pipe and the propeller shaft and the floor panel to prevent interference of the exhaust pipe or the propeller shaft with the floor panel. In addition, for example, an insulator is disposed on an inner surface of the tunnel portion in some cases. With these factors, the height of the tunnel portion from the floor panel is, for example, equal to or larger than 15 cm or equal to or larger than 20 cm in some cases, and as for a positional relation with a seat, an upper end of the tunnel portion is higher than a lower end of a seat cushion on a seat rail or an up-down direction central portion of the seat cushion. A structure without such a tunnel portion largely bulging upward is a tunnel-less structure.

The occupant-space-side floor panel 41 includes no tunnel portion having a height equal to or larger than 15 cm or equal to or larger than 20 cm from an upper surface of the occupant-space-side floor panel 41 as described above, but may include, for example, a bulging portion having a low height equal to or smaller than 5 cm or equal to or smaller than 10 cm from the upper surface of the occupant-space-side floor panel 41. In a case of such a bulging portion having a low height, neither exhaust pipe nor a propeller shaft can be inserted inside the bulging portion, and thus the bulging portion does not function as a tunnel portion. Thus, the occupant-space-side floor panel 41, which includes a bulging portion having a low height equal to or smaller than 5 cm or equal to or smaller than 10 cm from the upper surface of the occupant-space-side floor panel 41, is a floor panel of a tunnel-less structure.

In the present embodiment, since each powertrain PT includes the traveling motor M, no internal combustion engine needs to be mounted in the front side space R2 and thus no exhaust pipe needs to be guided to the vehicle rear side. When a powertrain PT is mounted in the rear-side space R4, the rear wheels RT can be driven by the powertrain PT and a propeller shaft can be omitted. Accordingly, the occupant-space-side floor panel 41 can have a tunnel-less structure.

Figure 3:
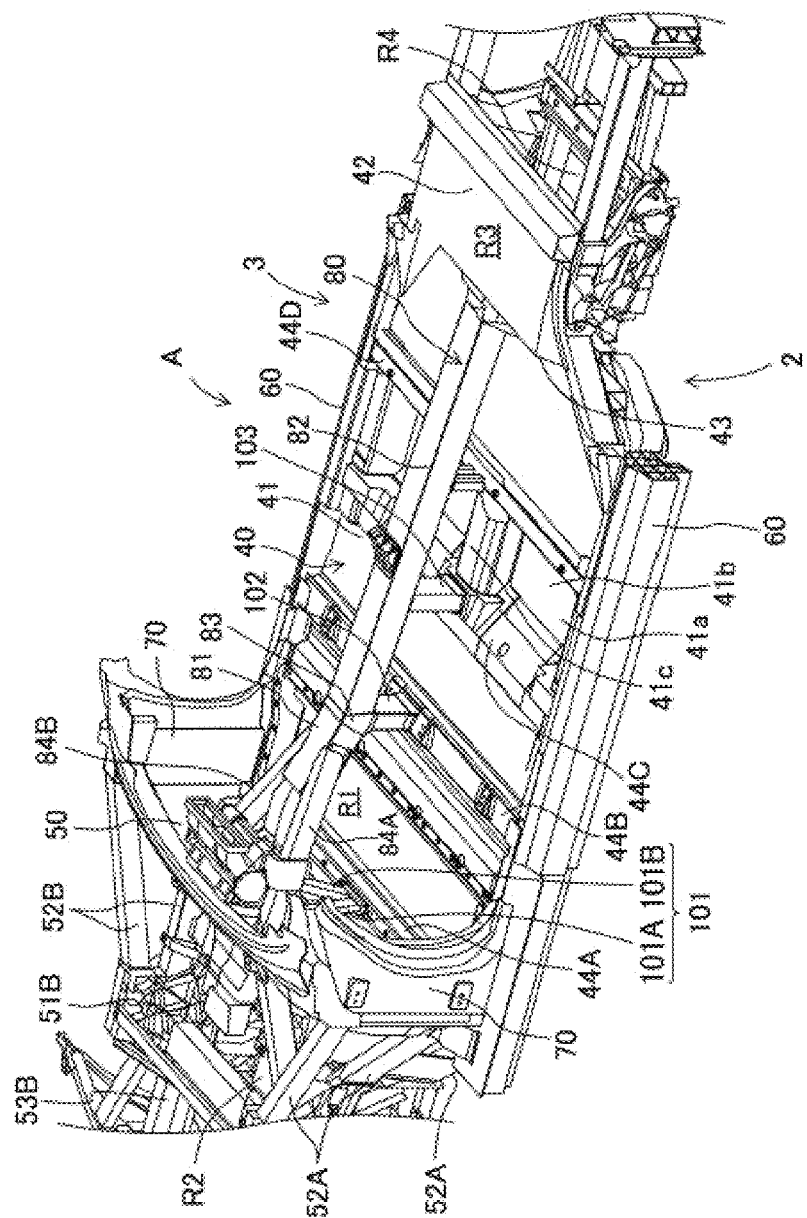
FIG. 3 is a perspective view in which part of the vehicle-body structure is viewed from an upper side.

As illustrated in FIG. 3 as well, a recessed portion 41a formed bulging downward is formed at a front-rear direction intermediate portion of the occupant-space-side floor panel 41. Specifically, the recessed portion 41a on which the feet of a passenger can be placed is formed at part of the occupant-space-side floor panel 41, which corresponds to the battery non-housing portion 202. The recessed portion 41a has a bottom surface 41b on which the feet of a rear-seat passenger sitting on a rear seat RS can be placed. The bottom surface 41b is substantially horizontally formed. A front-side part of the recessed portion 41a is formed to be gradually deeper toward the rear side. The recessed portion 41a may be continuously formed from a left side portion of the occupant-space-side floor panel 41 to a right side portion thereof. The bottom surface 41b has a height substantially same as that of a lower portion of the corresponding side sill 60 to be described later, and accordingly, the height of the bottom surface 41b is sufficiently low. Accordingly, a passenger staying space can be expanded by using the battery non-housing portion 202 of the lower-portion structural body 2.

The positional relation between the recessed portion 41a and a seat cushion of each rear seat RS in the front-rear direction is set such that the feet of a rear-seat passenger sitting on the rear seat RS are naturally placed on the bottom surface 41b when the feet are held directly downward. The position of a front portion of the recessed portion 41a is set such that the feet of a rear-seat passenger sitting on the rear seat RS are placed on the bottom surface 41b when the feet are moved obliquely forward. The position of the recessed portion 41a and the dimension thereof in the front-rear direction are set such that the feet of a rear-seat passenger can be placed on the bottom surface 41b even when the feet are moved somehow in the front-rear direction.

A floor frame 41c extending in the front-rear direction is provided at a right-left direction central portion of the recessed portion 41a. The floor frame 41c is formed surrounding the second rear-portion central member 18 of the lower-portion structural body 2 from the upper side and the right and left sides, and the second rear-portion central member 18 is housed inside the floor frame 41c from the lower side of the floor frame 41c when the lower-portion structural body 2 and the upper-portion structural body 3 are integrated. A part at which the recessed portion 41a is formed is reinforced since the floor frame 41c is provided.

The trunk-space-side floor panel 42 is positioned higher than the occupant-space-side floor panel 41. The rear-side space R4 is positioned lower than the trunk-space-side floor panel 42. In other words, the trunk-space-side floor panel 42 is arranged to separate the trunk space R3 from the rear-side space R4. Since the trunk-space-side floor panel 42 is arranged at a higher position than the occupant-space-side floor panel 41, the connection panel 43 extends in the up-down direction. The connection panel 43 may be vertical or may be tilted such that the connection panel 43 is positioned farther on the rear side at a position farther on the upper side.

As illustrated in FIG. 5 as well, the dash panel 50 is a member as a partition wall between the front side space R2 and the occupant space R1 and extends upward from a front portion of the occupant-space-side floor panel 41 and in the right-left direction as well, thereby partitioning the front portion of the occupant space R1.

Figure 4:
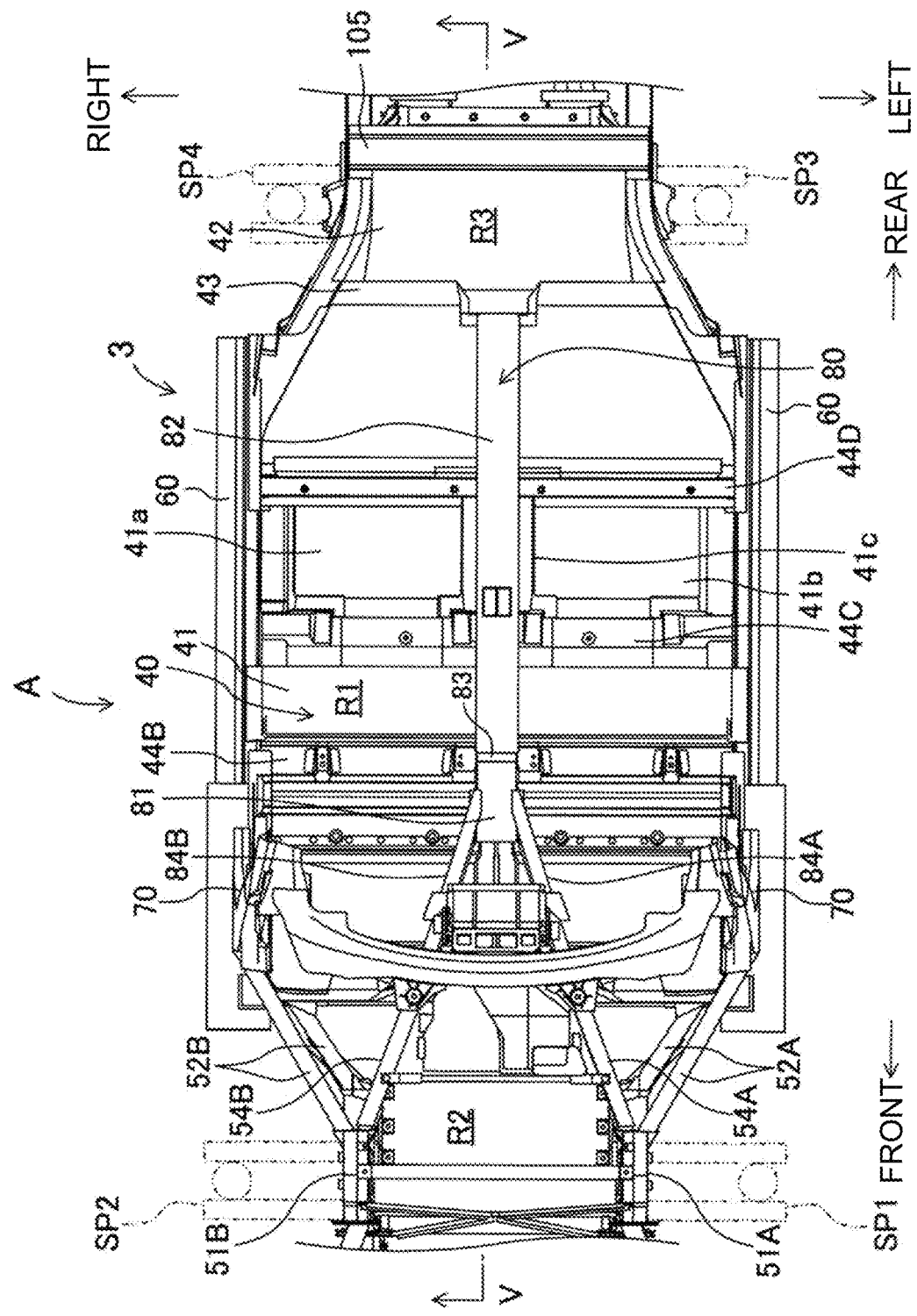
FIG. 4 is a plan view of part of the vehicle-body structure.

As illustrated in FIG. 4, the right and left side sills 60 are disposed extending in the front-rear direction at right and left end portions, respectively, of the occupant-space-side floor panel 41. A left end portion of the occupant-space-side floor panel 41 is connected to an up-down direction intermediate portion of the left side sill 60. Since the battery unit Y including the batteries FB and RB is disposed at a lower position than the occupant-space-side floor panel 41, such arrangement is made that the lower part of the side sill 60 overlaps with the batteries FB and RB in a vehicle side view. Similarly, the right side sill 60 is connected to the right end portion of the occupant-space-side floor panel 41.

As illustrated in FIG. 3, the upper-portion structural body 3 includes a pair of right and left hinge pillars 70. The right hinge pillar 70 extends upward from a front end portion of the right side sill 60. The left hinge pillar 70 extends upward from a front end portion of the left side sill 60. The right and left front doors FD (illustrated in FIG. 1) are rotatably attached to the right and left hinge pillars 70, respectively. A left edge portion of the dash panel 50 is connected to a right-side surface of the left hinge pillar 70. A right edge portion of the dash panel 50 is connected to a left-side surface of the right hinge pillar 70. Note that, although not illustrated, the upper-portion structural body 3 is also provided with a center pillar, a rear pillar, and the like.

As illustrated in FIG. 2, a left-side front-wheel suspension support member 51A that supports the suspension device (front suspension device) SP1 (illustrated with virtual lines in FIG. 4) for the left front wheel FT is provided on the left side on the front side of the dash panel 50 in the upper-portion structural body 3. A right-side front-wheel suspension support member 51B that supports the suspension device (front suspension device) SP2 (illustrated with virtual lines in FIG. 4) for the right front wheel FT is provided on the right side on the front side of the dash panel 50 in the upper-portion structural body 3. The suspension devices SP1 and SP2 are not limited to a particular format but include suspension arms that freely swingably support the front wheels FT in the up-down direction, shock absorbers, springs, or the like. End portions of the suspension arms on the vehicle body side, upper end portions of the shock absorbers, or the like are attached to the front-wheel suspension support members 51A and 51B. The front-wheel suspension support members 51A and 51B can be made of, for example, aluminum die cast, but are not limited thereto and may be made of a combination of steel plates or the like.

As illustrated in, for example, FIG. 2, three left-side fixation frames 52A for fixing the left-side front-wheel suspension support member 51A are provided on the left side on the front side of the dash panel 50. The three left-side fixation frames 52A are arranged at an interval from each other in the up-down direction, and front portions of the three left-side fixation frames 52A are fixed to the front-wheel suspension support member 51A. Rear portions of the left-side fixation frames 52A arranged uppermost and at an up-down direction intermediate position are fixed to the left-side hinge pillar 70 and the left side of the dash panel 50. A rear portion of the left-side fixation frame 52A arranged lowermost is fixed to the left side sill 60.

As partially illustrated in FIG. 3, three right-side fixation frames 52B for fixing the right-side front-wheel suspension support member 51B are provided on the right side on the front side of the dash panel 50. The three right-side fixation frames 52B are arranged at an interval from each other in the up-down direction, and front portions of the three right-side fixation frames 52B are fixed to the front-wheel suspension support member 51B. Rear portions of the right-side fixation frames 52B arranged uppermost and at an up-down direction intermediate position are fixed to the right-side hinge pillar 70 and the right side of the dash panel 50. A rear portion of the right-side fixation frame 52B arranged lowermost is fixed to the right side sill 60.

As illustrated in FIG. 2, a left-side crush can 53A extending toward the front side is fixed to a front portion of the left-side front-wheel suspension support member 51A. A right-side crush can 53B extending toward the front side is fixed to a front portion of the right-side front-wheel suspension support member 51B. A bumper reinforcement 140 extending in the right-left direction is attached to a front portion of the left-side crush can 53A and a front portion of the right-side crush can 53B.

As illustrated in FIG. 4, the upper-portion structural body 3 includes a left-side front frame 54A and a right-side front frame 54B. Specifically, the left-side front frame 54A connecting a front portion of a center frame 80 to be described later and the left-side front-wheel suspension support member 51A, and the right-side front frame 54B connecting the front portion of the center frame 80 and the right-side front-wheel suspension support member 51B are provided on the front side of the dash panel 50. The left-side front frame 54A is tilted such that the left-side front frame 54A is positioned farther on the left side at a position farther on the front side. The right-side front frame 54B is tilted such that the right-side front frame 54B is positioned farther on the right side at a position farther on the front side.

The occupant-space-side floor panel 41 includes a front-portion cross member 44A, an intermediate cross member 44B, a recessed-portion front-side cross member 44C, and a recessed-portion rear-side cross member 44D. The front-portion cross member 44A, the intermediate cross member 44B, the recessed-portion front-side cross member 44C, and the recessed-portion rear-side cross member 44D extend in the right-left direction and are fixed to the upper surface of the occupant-space-side floor panel 41. Thus, the front-portion cross member 44A, the intermediate cross member 44B, the recessed-portion front-side cross member 44C, and the recessed-portion rear-side cross member 44D are disposed such that the members intersect with the center frame 80, which will be described later, in a plan view in the occupant space R1.

The front-portion cross member 44A is disposed at the front portion of the occupant-space-side floor panel 41. A front portion of the front-portion cross member 44A is also joined to the lower portion of the dash panel 50. The intermediate cross member 44B is disposed on the rear side of the front-portion cross member 44A and on the front side of the recessed portion 41*a*, and a closed cross-section is constituted by the intermediate cross member 44B and the occupant-space-side floor panel 41.

The recessed-portion front-side cross member 44C is disposed extending in the right-left direction along the front portion of the recessed portion 41*a* on the rear side of the intermediate cross member 44B. The projecting-portion rear-side cross member 44D is disposed extending in the right-left direction along a rear portion of the recessed portion 41*a* on the rear side of the recessed-portion front-side cross member 44C. A closed cross-section is constituted by the recessed-portion front-side cross member 44C and the occupant-space-side floor panel 41, and a closed cross-section is constituted by the recessed-portion rear-side cross member 44D and the occupant-space-side floor panel 41. Since the recessed-portion front-side cross member 44C and the recessed-portion rear-side cross member 44D are provided, the part at which the recessed portion 41a is formed can be reinforced. A front portion of the floor frame 41c provided inside the recessed portion 41a is connected to a right-left direction central portion of the recessed-portion front-side cross member 44C, and a rear portion of the floor frame 41c is connected to a right-left direction central portion of the recessed-portion rear-side cross member 44D.

As illustrated in, for example, FIG. 5, the upper-portion structural body 3 includes the center frame 80 continuously extending in the front-rear direction from the dash panel 50 to the connection panel 43. The center frame 80 is positioned at a right-left direction central portion. Specifically, the disposition positions of the front-portion central member 16 and the first to third rear-portion central members 17 to 19 and the center frame 80 are set to have a positional relation in which the front-portion central member 16 and the first to third rear-portion central members 17 to 19 each overlaps with the center frame 80 in a plan view.

The center frame 80 is disposed to be higher than and away from the occupant-space-side floor panel 41 at a right-left direction central portion of the occupant space R1. A rear portion of the center frame 80 is connected to the connection panel 43. The left-side front seat FS and a rear seat RS are disposed on the left side of the center frame 80, and the right-side front seat FS and a rear seat RS are disposed on the right side of the center frame 80.

Since the center frame 80 is arranged to be higher than and away from the occupant-space-side floor panel 41, components and the like can be disposed in a space between a lower surface of the center frame 80 and the upper surface of the occupant-space-side floor panel 41. Alternatively, the space between the lower surface of the center frame 80 and the upper surface of the occupant-space-side floor panel 41 can be used as an object housing unit. As illustrated in FIG. 5, the center frame 80 according to the present embodiment includes a bend portion 80A that bends in the up-down direction at a front-rear direction intermediate portion. Since the bend portion 80A is provided in the center frame 80, for example, a rear-side part can be positioned lower than a front-side part, and thus comfort of rear-seat passengers can be improved. Since the front-side part of the center frame 80 can be positioned higher than the rear-side part, an object or the like can be arranged at a lower position than the front-side part of the center frame 80. The bend portion 80A is formed at a site on the front side of a front-rear direction central portion of the center frame 80.

Specifically, the center frame 80 includes a front-side frame member 81 extending in the front-rear direction, a rear-side frame member 82 disposed on the vehicle rear side of the front-side frame member 81 and extending toward the rear side, and a tubular connection member 83 connecting a rear portion of the front-side frame member 81 and a front portion of the rear-side frame member 82. The front-side frame member 81 and the rear-side frame member 82 have hollow shapes, in other words, tubular shapes extending in the front-rear direction and may be formed of, for example, an extruded material. The front-side frame member 81 and the rear-side frame member 82 having hollow shapes are lightweight and high-stiffness members. Vertical cross-sections of the front-side frame member 81 and the rear-side frame member 82 in the vehicle width direction have rectangular shapes, and thus the front-side frame member 81 and the rear-side frame member 82 each include an upper wall portion and a lower wall portion extending in the right-left direction and right and left sidewall portions extending in the up-down direction. Note that the cross-sectional shapes of the front-side frame member 81 and the rear-side frame member 82 are not limited to rectangular shapes but may be pentagonal shapes or higher polygonal shapes or may be circular shapes or elliptical shapes.

The dimension of the rear-side frame member 82 in the longitudinal direction is set to be longer than the dimension of the front-side frame member 81 in the longitudinal direction. Accordingly, a connection part between the front-side frame member 81 and the rear-side frame member 82 is positioned on the front side of a front-rear direction central portion of the occupant space R1. Note that the center frame 80 is not limited to the two-division structure of the front-side frame member 81 and the rear-side frame member 82 but may be formed as one member a front portion to a rear portion or may have a three-division structure.

The front-side frame member 81 is tilted at a first tilt angle relative to a horizontal plane and extends straight. The rear-side frame member 82 is tilted at a second tilt angle smaller than the first tilt angle relative to the horizontal plane and extends straight. Since the rear-side frame member 82 is tilted at a tilt angle different from that of the front-side frame member 81, the bend portion 80A that bends downward is formed at the connection part between the front-side frame member 81 and the rear-side frame member 82. In the present embodiment, the rear-side frame member 82 is arranged at a downward tilt toward the rear side. Note that the front-side frame member 81 and the rear-side frame member 82 may have the same tilt angle. In this case, no bend portion 80A is formed.

As illustrated in FIG. 4, the center frame 80 also includes a left-side frame member 84A and a right-side frame member 84B constituting the front portion of the center frame 80, and accordingly, has a shape bifurcated in the right-left direction. The left-side frame member 84A and the right-side frame member 84B are provided at an interval from each other in the right-left direction. A rear portion of the left-side frame member 84A is fixed to a left-side surface of a front-rear direction intermediate portion of the front-side frame member 81. The left-side frame member 84A is tilted from a fixation part to the front-side frame member 81 toward the front side in a plan view such that the left-side frame member 84A is positioned farther on the left side at a position farther on the front side. A front portion of the left-side frame member 84A is connected to a part of the dash panel 50 higher than and away from the occupant-space-side floor panel 41. A rear portion of the left-side front frame 54A is connected to the front portion of the left-side frame member 84A.

A rear portion of the right-side frame member 84B is fixed to a right-side surface of the front-rear direction intermediate portion of the front-side frame member 81. The right-side frame member 84B is tilted from a fixation part to the front-side frame member 81 toward the front side in a plan view such that the right-side frame member 84B is positioned farther on the right side at a position farther on the front side. A front portion of the right-side frame member 84B is connected to the part of the dash panel 50 higher than and away from the occupant-space-side floor panel 41. A rear portion of the right-side front frame 54B (illustrated in FIG. 4) is connected to the front portion of the right-side frame member 84B.

The upper-portion structural body 3 includes first to third connection members 101 to 103. The first to third connection members 101 to 103 are members for connecting the center frame 80 to the occupant-space-side floor panel 41, each member extending upward from the occupant-space-side floor panel 41 and having an upper portion fixed to the center frame 80. The first connection member 101 is disposed farthest on the front side in the occupant space R1, and the first connection member 101 is separated on the rear side from the dash panel 50. A lower portion of the first connection member 101 is fixed to a site separated on the rear side from the dash panel 50 on the occupant-space-side floor panel 41, and an upper portion of the first connection member 101 is fixed to a site separated on the rear side from the dash panel 50 on the center frame 80.

As illustrated in, for example, FIG. 3, the second connection member 102 is separately disposed on the rear side of the first connection member 101. The lower portion of the first connection member 101 and a lower portion of the second connection member 102 are fixed to sites separated from each other in the front-rear direction on the occupant-space-side floor panel 41. The upper portion of the first connection member 101 and an upper portion of the second connection member 102 are fixed to sites separated from each other in the front-rear direction of the center frame 80.

As illustrated in FIG. 3, the first connection member 101 includes a left-side member (left-side connection member) 101A and a right-side member (right-side connection member) 101B. Lower portions of the left-side member 101A and the right-side member 101B are fixed to the front-portion cross member 44A. The left-side member 101A extends at a tilt in a front view such that the left-side member 101A is positioned farther on the left side at a position farther on the upper side from the front-portion cross member 44A. An upper portion of the left-side member 101A is fixed to the front portion of the left-side frame member 84A of the center frame 80.

The right-side member 101B extends at a tilt in a front view such that the right-side member 101B is positioned farther on the right side at a position farther on the upper side from the front-portion cross member 44A. An upper portion of the right-side member 101B is fixed to the front portion of the right-side frame member 84B of the center frame 80. Since the front portion of the left-side frame member 84A and the front portion of the right-side frame member 84B are separated from each other in the right-left direction, most parts of the left-side member 101A and the right-side member 101B except for the lower portions thereof are separated from each other in the right-left direction, and accordingly, the interval between the left-side member 101A and the right-side member 101B in the right-left direction is larger at a position farther on the upper side.

A lower portion of the second connection member 102 is fixed to the intermediate cross member 44B. The upper portion of the second connection member 102 is fixed to the bend portion 80A of the center frame 80. Accordingly, the second connection member 102 extends from the bend portion 80A of the center frame 80 toward the occupant-space-side floor panel 41.

A lower portion of the third connection member 103 is fixed to the recessed-portion front-side cross member 44C. The recessed-portion front-side cross member 44C is disposed directly above the second rear-portion central member 18, and the right-left direction central portion of the recessed-portion front-side cross member 44C is fixed to a front portion of the second rear-portion central member 18. Accordingly, the lower portion of the third connection member 103 is fixed to part of the occupant-space-side floor panel 41, which corresponds to the second rear-portion central member 18. An upper portion of the third connection member 103 is fixed to the lower wall portion of the rear-side frame member 82 of the center frame 80.

Load Path at Collision

Subsequently, a case in which the automobile 1 undergoes front collision is assumed. At front collision of the automobile 1, an impact load is input from the bumper reinforcement 140 to the left-side crush can 53A and the right-side crush can 53B. The impact load input to the left-side crush can 53A and the right-side crush can 53B is transferred to the right and left front-wheel suspension support members 51A and 51B.

Since the right and left front-wheel suspension support members 51A and 51B are connected to the dash panel 50, the center frame 80, and the front support frames 20, the impact load input to the right and left front-wheel suspension support members 51A and 51B is transferred to the dash panel 50, the center frame 80, and the front support frames 20 and absorbed. In addition, since the right and left front-wheel suspension support members 51A and 51B are also connected to the right and left side sills 60 and 60, the impact load input to the right and left front-wheel suspension support members 51A and 51B is also transferred to the right and left side sills 60 and 60 and absorbed.

Furthermore, since the front portion of the center frame 80 and the left-side front-wheel suspension support member 51A are connected to each other through the left-side front frame 54A and the front portion of the center frame 80 and the right-side front-wheel suspension support member 51B are connected to each other through the right-side front frame 54B, the impact load is also input to the center frame 80 and absorbed.

In addition, since a rear portion of each front support frame 20 is connected to the rack frame 10 included in the battery unit Y, the impact load input to the front support frame 20 is also transferred to the rack frame 10 and absorbed. In this case, since not only the left-side member 11 and the right-side member 12 extending in the front-rear direction but also the front-portion central member 16 and the first to third rear-portion central members 17 to 19 are provided extending in the front-rear direction in the rack frame 10, the impact load can also be absorbed by these members 11, 12, and 16 to 19. In addition, similarly to the front-portion central member 16 and the first to third rear-portion central members 17 to 19, since the floor frame 41c is provided extending in the front-rear direction inside the recessed portion 41a of the occupant-space-side floor panel 41, the impact load can be absorbed by the floor frame 41c as well. A plurality of load paths are provided in this manner, and thus it is possible to maintain the occupant space R1 at collision.

As described above, according to embodiments of the disclosure, since the battery non-housing portion 202 is provided below the occupant-space-side floor panel 41, the occupant-space-side floor panel 41 can be lowered at the part corresponding to the battery non-housing portion 202 to expand a foot space for a front-seat passenger. Accordingly, comfort of a vehicle cabin improves.

Since no battery is housed in the battery non-housing portion 202, vehicle-body stiffness potentially decreases at that part, but in the present embodiment, not only the front-portion central member 16 and the first to third rear-portion central members 17 to 19 extending in the front-rear direction are disposed below the occupant-space-side floor panel 41 but also the second rear-portion central member 18 disposed at the battery non-housing portion 202 is larger in width than the front-portion central member 16 and the third rear-portion central member 19 disposed at the battery housing portions 200 and 201 and has high strength, and accordingly, vehicle-body stiffness of the battery non-housing portion 202 can be increased, which improves vehicle safety.

Moreover, since the batteries FB and RB are housed in the front-side battery housing portion 200 and the rear-side battery housing portion 201, respectively, the number of mounted batteries can be increased, and in this case, passenger comfort can be improved by using the battery non-housing portion 202 positioned between the front-side battery housing portion 200 and the rear-side battery housing portion 201.

In addition, since the first harness 204 and the second harness 205 are disposed alongside each other in the vehicle width direction below the second rear-portion central member 18 having a larger width, the dimension in the up-down direction is shortened so that adverse influence on comfort is avoided, and both harnesses 204 and 205 can be collectively disposed.

As described above, a vehicle-body structure according to the present disclosure is applicable to, for example, an electric vehicle and other automobiles.

REFERENCE SIGNS LIST 1 automobile
10 rack frame
16 front-portion central member (front-side first frame portion)
17 first rear-portion central member (front-side first frame portion)
18 second rear-portion central member (second frame portion)
19 third rear-portion central member (rear-side first frame portion)
41 occupant-space-side floor panel
80 center frame
103 third connection member
200 front-side battery housing portion
201 rear-side battery housing portion
202 battery non-housing portion
204 first harness
205 second harness
FB, RB battery
M traveling motor The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

What is claimed is:

1. A vehicle-body structure provided in an electric vehicle comprising a traveling motor, the vehicle-body structure comprising:
    a battery and a battery frame,
    wherein the battery supplies electric power to the traveling motor, and the battery frame is disposed below a vehicle cabin and extends in a vehicle front-rear direction,
    wherein a battery housing portion in which the battery is housed and a battery non-housing portion in which the battery is not housed are provided alongside each other in a vehicle front-rear direction below the vehicle cabin,
    wherein the battery frame comprises a first frame portion disposed at the battery housing portion, and a second frame portion disposed at the battery non-housing portion, and
    wherein the second frame portion is larger in width than the first frame portion in a vehicle-width direction.

2. The vehicle-body structure according to claim 1, wherein the battery housing portion comprises a front-side battery housing portion provided on a vehicle front side of the battery non-housing portion, and a rear-side battery housing portion provided on a vehicle rear side of the battery non-housing portion, and
    the first frame portion comprises a front-side first frame portion disposed at the front-side battery housing portion, and a rear-side first frame portion disposed at the rear-side battery housing portion.

3. The vehicle-body structure according to claim 2, wherein
    the first frame portion and the second frame portion have hollow shapes, and
    a first harness extending in the vehicle front-rear direction is disposed below the first frame portion and the second frame portion.

4. The vehicle-body structure according to claim 3, wherein
    a second harness for a bus bar connecting a battery housed in the front-side battery housing portion and a battery housed in the rear-side battery housing portion is disposed alongside of the first harness in the vehicle width direction below the second frame portion.

5. The vehicle-body structure according to claim 4, wherein
    a recessed portion that is recessed downward is formed at a part of a floor panel corresponding to the battery non-housing portion.

6. The vehicle-body structure according to claim 5, further comprising:

a center frame disposed to be higher than and away from a floor panel at a vehicle-width-direction central portion of an occupant space and extending in the vehicle front-rear direction; and a connection member having an upper portion fixed to the center frame and having a lower portion fixed to a part of the floor panel, the part corresponding to the second frame portion.

7. The vehicle-body structure according to claim 4, further comprising:

a center frame disposed to be higher than and away from a floor panel at a vehicle-width-direction central portion of an occupant space and extending in the vehicle front-rear direction; and a connection member having an upper portion fixed to the center frame and having a lower portion fixed to a part of the floor panel, the part corresponding to the second frame portion.

8. The vehicle-body structure according to claim 3, wherein a recessed portion that is recessed downward is formed at a part of a floor panel corresponding to the battery non-housing portion.

9. The vehicle-body structure according to claim 3, further comprising:

a center frame disposed to be higher than and away from a floor panel at a vehicle-width-direction central portion of an occupant space and extending in the vehicle front-rear direction; and a connection member having an upper portion fixed to the center frame and having a lower portion fixed to a part of the floor panel, the part corresponding to the second frame portion.

10. The vehicle-body structure according to claim 1, wherein a recessed portion that is recessed downward is formed at a part of a floor panel corresponding to the battery non-housing portion.

11. The vehicle-body structure according to claim 1, further comprising:

a center frame disposed to be higher than and away from a floor panel at a vehicle-width-direction central portion of an occupant space and extending in the vehicle front-rear direction; and a connection member having an upper portion fixed to the center frame and having a lower portion fixed to a part of the floor panel, the part corresponding to the second frame portion.

12. The vehicle-body structure according to claim 2, wherein a recessed portion that is recessed downward is formed at a part of a floor panel corresponding to the battery non-housing portion.

13. The vehicle-body structure according to claim 2, further comprising:

a center frame disposed to be higher than and away from a floor panel at a vehicle-width-direction central portion of an occupant space and extending in the vehicle front-rear direction; and a connection member having an upper portion fixed to the center frame and having a lower portion fixed to a part of the floor panel, the part corresponding to the second frame portion.

* * * * *